June 8, 1926.
M. L. McGRAW
SHOT FIRER
Filed Sept. 26, 1925
1,587,664
2 Sheets-Sheet 1
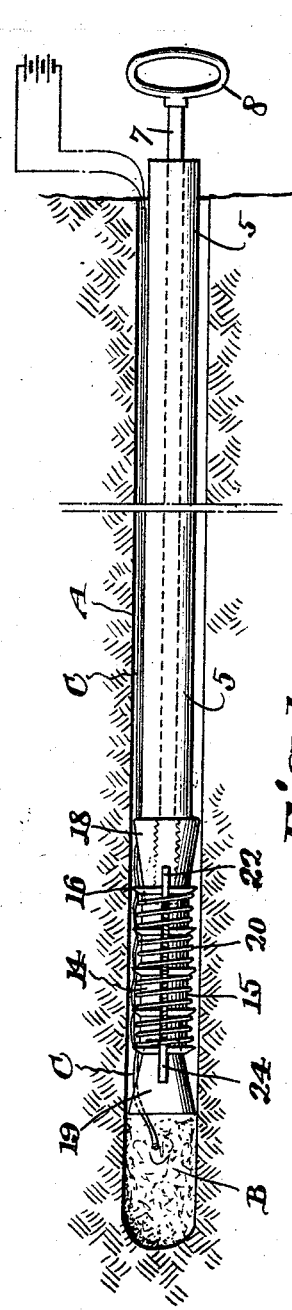
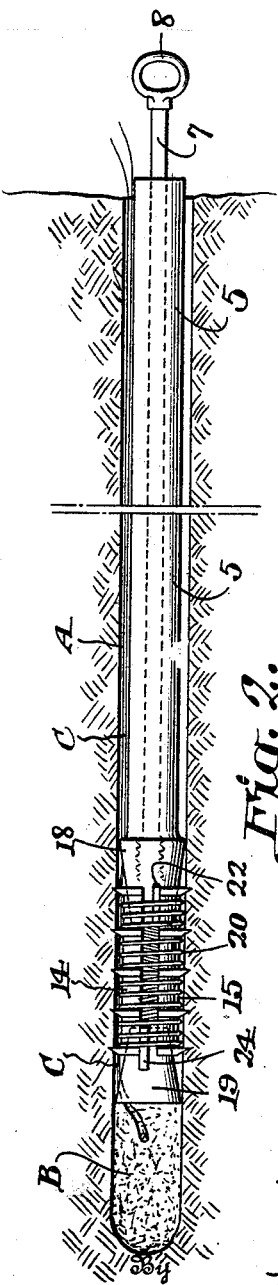
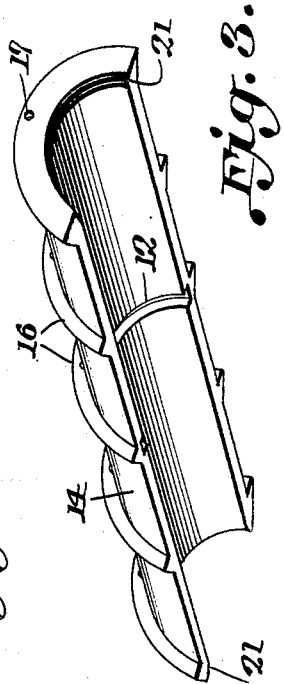
Inventor
M. L. McGraw June 8, 1926.
M. L. McGRAW
SHOT FIRER
Filed Sept. 26, 1925
1,587,664
2 Sheets-Sheet 2
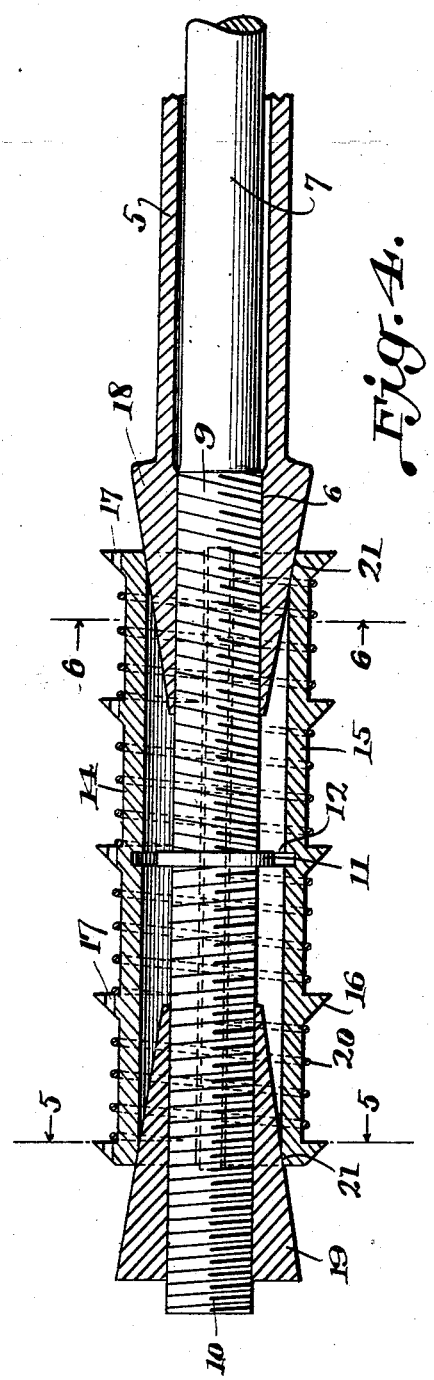
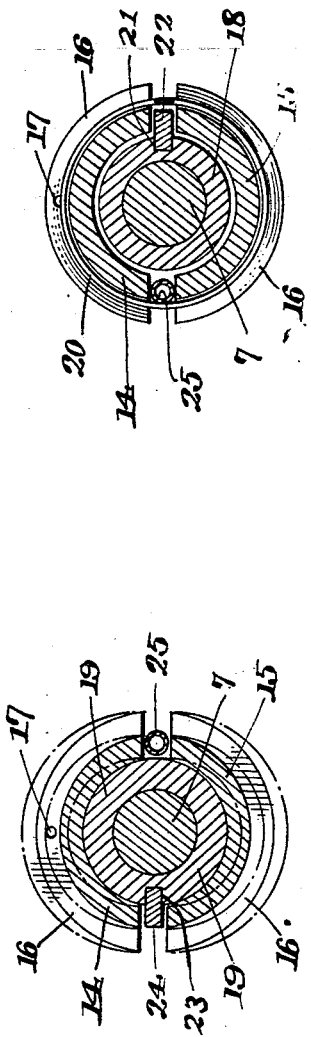
Inventor
M. L. McGraw
By Lester L. Sargent
Attorney Patented June 8, 1926.

1,587,664

UNITED STATES PATENT OFFICE.

MICHAEL L. McGRAW, OF CLARKSBURG, WEST VIRGINIA.

SHOT FIRER.

Application filed September 26, 1925. Serial No. 58,933.

The object of my invention is to provide a novel and efficient machine for use in a hole drilled for firing explosives. I attain this and other objects of my invention by the device illustrated in the accompanying drawings, in which—

Figure 1 is a side elevation of the invention in its initial position before operation;

Fig. 2 is a side elevation of the invention in its expanded position caused by its operation;

Fig. 3 is a detail perspective view of member 14;

Fig. 4 is a longitudinal section through the device;

Fig. 5 is a transverse section on line 5—5 of Fig. 4; and

Fig. 6 is a transverse section on line 6—6 of Fig. 4.

Like characters of reference designate like parts in each of the several views.

Referring to the accompanying drawing, A indicates a hole drilled in the earth in which is placed an explosive charge B to be fired by a spark generated by the electric wires C after the shot firing device has been clamped in its place in the earth, as shown in Fig. 2. As indicated in the drawings, I provide a firing tube 5 having a tapered or frusto-conical head 18, the interior of which is in threaded engagement with the treaded portion 9 of rod 7, as indicated in Figs. 1 and 2. I provide suitable handle 8 on rod 7. Rod 7 is also provided with an annular flange 11 and with a threaded portion 10 threaded in reverse direction from the threaded portion 9. I provide a pair of semi-cylindrical resistant arcs 14 and 15 having an annular groove 12 in which the annular flange 11 seats. I provide a tapered or frusto-conical tubular end screw 19 threaded on threaded portion 10 of rod 7. Members 14 and 15 have a beveled inner surface 21 at the point where they contact with tapered members 18 and 19, as indicated in Fig. 4. Anchor members 14 and 15 are provided with spaced annular teeth or projection rings 16; and teeth or projection rings 16 are, in turn, provided with apertures 17. I provide springs 20 encircling anchor members 14 and 15 and resiliently holding them in proximity to each other. I provide a key 22 positioned between arcs 14 and 15 and seated in slot 21 in member 18, as shown in Fig. 6. I also provide similar key 24 positioned between members 14 and 15 and seated in a similar slot 23 in member 19. I provide a tube 25 between members 14 and 15, as shown in Figs. 5 and 6 and welded to one of those members for the purpose of holding the wire leading to the charge of powder.

When the handle on one end of the firing rod is turned and the pressure pipe held stationary the keys on the pressure pipe and the tubular end screw being engaged between the resistant arcs prevents the end screw from turning. The right and left hand threads on the firing rod moving in the threads in the end screw and the pressure pipe bring them towards one another, thereby forcing the anchor members outwards against the pressure of the spring or springs surrounding the resistant arcs. The projection rings on the resistant arcs being thereby forced outwards will bury themselves in the walls of the hole in which the machine is placed, thus blocking it up so that the charge will take effect as desired.

After the shot is fired in order to bring the resistant arcs in position to get the machine hole where the charge is to be fired, the handle on the firing rod must be turned in the opposite direction so that the spring or springs can force the resistant arcs into a smaller diameter over all by drawing the frusto-conical end screw away from the anchor members.

The firing rod can be made of steel or other suitable material. It is a round rod of any diameter and length to suit any particular condition. One end of the rod is bent to make some convenient handle for turning. At the other end threads are run to suit length of anchor members from the end, then a short blank space, and threads run in the opposite direction for a distance suitable to conditions.

The pressure pipe can be made of steel, iron, or other suitable material. The pressure pipe fits loosely around the firing rod and is a few inches shorter. The end nearest the explosive is threaded for a few inches and made smaller than the regular pipe diameter in order that the threads may engage the threads in the firing rod. These threads are opposite in direction to the threads in the end screw and at the end of the firing rod. The outside diameter of the end next to the explosive is enlarged a short distance back and tapers with a smooth curve to the end, in order that when the firing rod is turned and the pressure pipe held stationary the resistant arcs will be forced outward by sliding up this taper at the end of the pressure pipe.

The anchor members may be made of iron, steel, or any other suitable material and are two in number. They operate around the firing rod between the pressure pipe and the end screw and are each a little less than a semi-circle, in order to leave a space between them on each side. There are two or more projection rings around the outside of the anchor members tapered at the outward edge so that they will penetrate the walls of the holes as easily as possible. There is a small hole drilled through the projection rings of one of the anchor members, in a straight line, to receive the shooting wires. The outside edge of the inside anchor members is beveled to the same curvature as the curve tapers at the enlarged ends of the pressure pipe and the end screw in order that they may slide over one another as easily as possible.

The anchor members' springs surround the resistant arcs and hold them in place. They may be either coil or band springs of any size required, of any suitable material and one less in number than there are projection rings on the resistant arcs.

The end screw may be made of iron, steel, or other suitable material. It is a small round piece of material drilled in the center and threaded to fit over the end of the firing rod. The surface next to the explosive is flat and tapered back to the opposite end with a smooth slight taper, so that the resistant arcs may slide over this when the end screw is drawn into the resistant arcs by turning the firing arm.

The end screw and the pressure pipe key are small projections from the plane of the taper on the end screw and pressure pipe respectively, that engage between the openings between the resistance arcs. Thus when the pressure pipe is held stationary the keys hold the resistant arcs and the end screw from revolving when the firing rod is turned.

Keys 22 and 24 are either welded into place or are integral with members 18 and 19.

What I claim is:—

1. In a shot firer, the combination of a rod having a handle at one end, and having an annular flange near the other end, and having oppositely disposed threaded portions on each side of said flange, a tubular member within which the rod is mounted said tubular member having a frusto-conical head in threaded engagement with the threaded portion of the rod above the annular flange, a frusto-conical end screw in threaded engagement with the theaded portion of the rod below the annular flange, a pair of anchor members of approximately semi-circular shape having their end portions engaging the tapered walls of the frusto-conical members, and resilient means pressing the semicylindrical members towards each other.

2. In a shot firer, the combination of a rod having a handle at one end, and having an annular flange near the other end, and having oppositely disposed threaded portions on each side of said flange, a tubular member within which the rod is mounted said tubular member having a frusto-conical head in threaded engagement with the threaded portion of the rod above the annular flange, a frusto-conical end screw in threaded engagement with the threaded portion of the rod below the annular flange, a pair of anchor members of approximately semi-circular shape having their end portions engaging the tapered walls of the frusto-conical members, resilient means pressing the semi-circular members toward each other, and spaced peripherial tapered projection rings on the resistant arcs.

3. In a shot firer, the combination of a rod having a handle at one end, and having an annular flange near the other end, and having oppositely disposed threaded portions on each side of said flange, a tubular member within which the rod is mounted said tubular member having a frustro-conical head in threaded engagement with the theadportion of the rod above the annular flange, a frusto-conical end screw in threaded engagement with the theaded portion of the rod below the annular flange, a pair of anchor members of approximately semi-cylindrical shape having their end portions engaging the tapered walls of the frusto-conical members, resilient means pressing the semi-cylindrical members toward each other, keys projecting from the frusto-conical screw and engaging between the semi-cylindrical members.

4. In a shot firer, the combination of a rod having a handle at one end, and having an annular flange near the other end, and having oppositely disposed threaded portions on each side of said flange, a tubular member within which the rod is mounted, said tubular member having a frusto-conical head in threaded engagement with the threaded portion of the rod above the annular flange, a frusto-conical end screw in treaded engagement with the threaded portion of the rod below the annular flange, a pair of anchor members of approximately semicircular shape having their end portions engaging the tapered walls of the frusto-conical members, resilient means pressing the semi-circular members toward each other, spaced peripheral tapered projection rings on the resistant arcs, and a series of alined apertures through the spaced projection rings.

5. In a shot firer, the combination of a rod having a handle at one end, and having an annular flange near the other end, and having oppositely disposed threaded portions on each side of said flange, a tubular member within which the rod is mounted said tubular member having a frusto-conical head in threaded engagement with the threaded portion of the rod above the annular flange, a frusto-conical screw in threaded engagement with the threaded portion of the rod below the annular flange, a pair of anchor members of approximately semi-cylindrical shape having their end portions engaging the tapered walls of the frusto-conical members, the semi-cylindrical members having alined semi-circular grooves in which the annular flange on the rod is adapted to seat, and resilient means pressing the semi-cylindrical members toward each other.

MICHAEL L. McGRAW.